United States Patent
Lu et al.

(10) Patent No.: US 11,629,285 B2
(45) Date of Patent: Apr. 18, 2023

(54) METHODS AND SYSTEMS FOR ADDING FUNCTIONALITY FOR CROSS LINKED POLYMERS IN A WELLBORE ENVIRONMENT

(71) Applicant: HIGHLAND FLUID TECHNOLOGY, Houston, TX (US)

(72) Inventors: Shawn Lu, Katy, TX (US); Kevin Wilbur Smith, Bellaire, TX (US)

(73) Assignee: SciDev Energy Services, Inc., Housont, TX (US)

( * ) Notice: Subject to any disclaimer, the term of this patent is extended or adjusted under 35 U.S.C. 154(b) by 0 days.

(21) Appl. No.: 17/680,528

(22) Filed: Feb. 25, 2022

(65) Prior Publication Data
US 2022/0267666 A1    Aug. 25, 2022

Related U.S. Application Data

(60) Provisional application No. 63/153,490, filed on Feb. 25, 2021, provisional application No. 63/153,498, filed on Feb. 25, 2021.

(51) Int. Cl.
*C09K 8/80* (2006.01)
*C09K 8/60* (2006.01)
*C09K 8/92* (2006.01)
*E21B 43/267* (2006.01)

(52) U.S. Cl.
CPC ............ *C09K 8/80* (2013.01); *C09K 8/604* (2013.01); *C09K 8/92* (2013.01); *E21B 43/267* (2013.01)

(58) Field of Classification Search
CPC ........ E21B 43/267; E21B 43/26; E21B 43/20; E21B 43/16
See application file for complete search history.

(56) References Cited

U.S. PATENT DOCUMENTS 10,472,943 B2 * 11/2019 Mahoney ............... C09K 8/80

OTHER PUBLICATIONS

Text and image merge of CN 102892973. (Year: 2013).*

* cited by examiner

*Primary Examiner* — Zakiya W Bates
(74) *Attorney, Agent, or Firm* — Pierson Intellectual Property LLC

(57) ABSTRACT

Forming a hydrogel in-situ downhole by pumping multiple polymers together that synergistically work together to reduce the flow of water through a proppant pack

11 Claims, 3 Drawing Sheets

METHODS AND SYSTEMS FOR ADDING FUNCTIONALITY FOR CROSS LINKED POLYMERS IN A WELLBORE ENVIRONMENT

BACKGROUND INFORMATION

Field of the Disclosure

Examples of the present disclosure relate to systems and methods for adding functionality to polymers cross linked in-situ in the downhole environment. Specifically, embodiments are directed towards forming a hydrogel downhole by pumping multiple polymers together that synergistically work together to reduce the flow of water through a proppant pack while allowing more vicious oil to flow through the hydrogel.

Background

Production wells penetrate subterranean formations whose yield, besides the desired lighter fluid, such as oil, includes a heavier undesirable fluid, such as water. Over time the percentage of water produced from the formation typically increases. The production of water to the ground surface results in increased costs in both the energy to lift the water to the surface and in surface handling. Accordingly, many wells become uneconomic due to excess water production.

Horizontal drilling combined with massive volumes of water used in fracturing has increased the supply of hydrocarbons, but not without creating other problems. One significant problem is that fracturing not only stimulates hydrocarbon production but can also increase water production. Worldwide for every barrel of oil produced, 4-5 bbls of water are produced. In more extreme cases, the water oil ratio can even be 20:1 or greater.

Pumps are used to "lift" the fluids to the surface where they can be processed. Lifting water means a bigger pump using more energy than needed for just the oil. Oil, gas, and water are found together in most reservoirs. Limiting the amount of water produced has been an ongoing challenge in oilfield environments.

Accordingly, needs exist for systems and methods that use relative permeability modifiers that are polymers, surfactants, or combinations of both that change the relative permeability to oil compared to water, which can hinder the flow of water but not the flow of hydrocarbons. This would result in oil production flowing upward before the water by creating viscous drag in the water and changing the contact angle of the water on the rock to keep the rock more water wet.

SUMMARY

Embodiments are directed towards systems and methods that use multiple cationic polymers in a downhole environment, wherein a first cationic polymer acts as a friction reducer that is configured to act as a friction reducer that hydrolyzes, and a second cationic polymer that acts as permeability modifiers (RPM) and does not hydrolyze. The second cationic polymers may be a polymer or a mixture of polymers, copolymers and cationic surfactants, or combinations of both that change the relative permeability to oil compared to water, which hinder the flow of water but not the flow of hydrocarbons. This would result in oil production flowing upward before the water by creating viscous drag in the water and changing the contact angle of the water in the proppant and on the rock to modify the relative permeability of both to promote oil flow, not water. Accordingly, embodiments are directed towards a polymer that reduces friction while being pumped downhole, and a second polymer or surfactant that cross-link in-situ to make the proppant pack more permeable to oil but less permeable to water. This may enable a friction reducer and an RPM (relative permeability modifier) polymer or surfactant to be pumped downhole that helps place proppant in the fracture while restricting the flow of water without having to pump additional fluids downhole in a remedial job.

Generally, embodiments are directed towards making polyelectrolyte complexes (PEC) downhole when fracturing a well or when refracturing a well. Embodiments of a cationic polyacrylamide may include a first cationic polymer that hydrolyzes and a second cationic polymer that doesn't hydrolyze, wherein the first cationic polymer may be configured to reduce friction. Friction reduction generally requires a higher MW polymer with about 10 million Dalton molecular weight. The second cationic polymer does not hydrolyze nor will it have high enough molecular weight to reduce friction but will act as an RPM. Such polymers and/or surfactants will generally have a molecular weight of less than 2 million Daltons.

In embodiments, the cationic polymers may be macromolecules that bear positive charges, which can be either intrinsically, present in the polymer backbone and/or in the side chains. Because the first cationic polymer hydrolyze downhole and change from cationic to anionic quickly, it is desirable to have a first cationic polymer that hydrolyzes and a second cationic polymer that does not hydrolyze to form super absorbent polymer, or hydrogel, that mitigates water production. While polyelectrolyte complexes are known to those skilled in the art, they are hard to make and use because the hydrogel forms too quickly. Pumping a cationic polymer that hydrolyzes slowly solves the mixing and placement issues. The complex forms in-situ within the poppant pack.

For example, the second cationic polymer may be a low molecular weight Polydiallyldimethylammonium chloride (polyDADMAC), Polyamine, Polyethyleneimine, or any cationic polymer or surfactant that does not hydrolyze with increasing temperature and pH wherein the first cationic polymer may adhere to the sand. This adhesion may limit the amount of water that can flow through the cationic polyacrylamide (hydrogel), while allowing more viscous oil to flow through the cationic polyacrylamide.

The first cationic polymer and the second cationic polymer are configured to be pumped downhole together to form the PEC. In embodiments, making the PEC in-situ within the wellbore environment provides both excellent friction reduction and water control. The downhole cross-linking the friction reducer with a cationic polymer that does not hydrolyze will make a super absorbent in the proppant pack, and limit the amount of water produced.

Further embodiments may include a cationic surfactant. The cationic surfactant may be is positively charged surfactant and has a hydrophilic base whose molecules are dissolved in water and attached to a lipophilic base. The lipophilic base is usually a long carbon chain hydrocarbon base.

Accordingly, embodiments are directed towards a polymer having multiple functionalities to reduce friction during the fracture treatment, help to place proppant in the fracture, work in recycled oilfield waters and have long-term functionality to reduce water flow. To reduce in situ water flow, the polymer must work to limit water flow in the proppant pack. Therefore, the polymer should adhere to silica or ceramic proppant. To have long-term efficacy, the polymer should create viscous drag in high total dissolves solids (TDS) water.

Additionally, recycled oilfield water used for fracturing also requires a friction reducer that works in high TDS water. Most cationic polymers used for friction reduction are Acryloyloxyethyltrimethyl Ammonium Chloride (AETAC) / acrylamide (AM) copolymers that hydrolyze and lose cationic functionality. These cationic polymers work well as a friction reducer, work in recycled water and AETAC is cost effective. Initially, these cationic polymers function very well as a relative permeability modifier (RPM) in the proppant pack, but quickly lose long-term efficacy for water control. The AETAC monomer degrades, and the remaining polymer loses its cationic charge becoming anionic in the process. The perceived disadvantage can be used as an advantage to improve relatively permeability management. Those skilled in the art will know that AETAC copolymers will hydrolyze and convert from cationic to anionic measured by zeta potential with pH and with time, and it happens within hours, but that is enough time to pump the cationic friction reducing polymer and the relative permeability modifying polymer and/or surfactant together into the fracture.

To this end, pumping a second cationic polymer such as polyDADMAC in combination with the first cationic polymer, such as the AETAC/AM copolymer friction reducer, will form a robust hydrogel over time as the AETAC monomer degrades. The formed hydrogel improves relative permeability modification in the proppant pack. The reaction can be seen by mixing the cationic AETAC friction reducer at 2 pounds per thousand gallons with 1 gallon per thousand gallons of a 20% solution of polyDADMAC. Initially the solution will be clear but convert to cloudy after one hour at 150° F.

Alternatively, acrylamidopropyltrimethyl ammonium chloride (APTAC)/AM copolymers are not easily hydrolyzed and also work as friction reducers. Water control can be enhanced and have a longer efficacy using a hydrogel. Both APTAC and AETAC copolymers form hydrogels with polyDADMAC, diallyldimethylammonium chloride (DADMAC)/acrylamide (AM), DADMAC/ acrylic acid (AA), DADMAC/Dextran or DADMAC/Acrylamide tertiary butyl sulfonic acid (ATBS) copolymer that behave like amphoteric molecules showing both anionic and cationic compatibility. Since both polymers adhere to silica and ceramic surfaces, both polymers can help place proppant in the fracture by making it harder for the proppant to settle due to viscous drag.

Furthermore, because the second cationic polymer is an RPM polymer that is in contact with the proppant before it is introduced into the fracture, and more importantly before it is in contact with any oil, it will not attach itself to oily surfaces because RPM polymers do not gel in oil and will not attach to oily surfaces. A challenge for remedial RPM treatments is to first water wet surfaces downhole that are oil wet so that the RPM polymer can attach to the surfaces. The water wetting step adds a variable that is not easily controlled. Fracturing treatments are done with water, the proppant surfaces are already water wet and do not contact oil until they are pumped into the formation. Sequentially treating the proppant before it contacts any oil removes the variable of first making sure surfaces downhole are water wet.

In embodiments, DADMAC polymers can form hydrogels with anionic terpolymers that contain an anchoring monomer such as N-Vinyl Pyrrolidone and N-Vinyl Formamide. Such polymers contain Acrylamide, ATBS and NVP or NVF. DADMAC/AM, DADMAC/ATBS, DADMAC/AA and DADMAC/Dextran are essentially amphoteric and are compatible with anionic polymers. DADMAC copolymers are well documented as dust control additives. Silica dust is a challenging problem with adding proppant during a fracture treatment. Silicosis causes lung cancer. The DADMAC copolymer can be sprayed on the proppant to prevent dust and still form a hydrogel with the friction reducing polymer.

To this end, mixing different water-soluble polymers into a network to create a hydrogel that functions as a friction reducer has many advantages including, but not limited to good friction reduction, compatibility with recycled oilfield waters, better proppant placement, and a more likely successful, long-term treatment since the polymer is applied before contact with formation oil.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
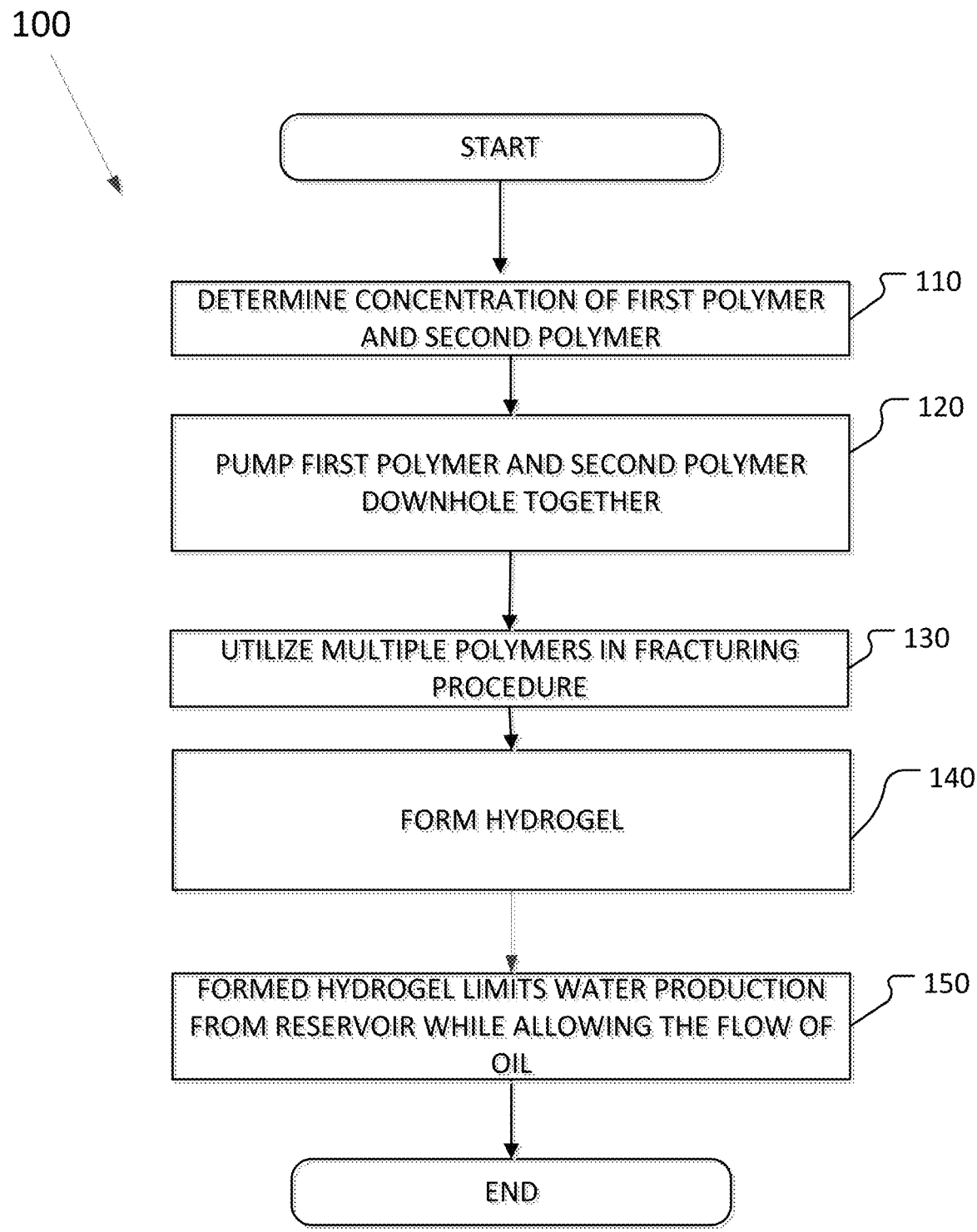
FIG. 1 depicts a method for utilizing multiple polymers for friction reduction while restricting the flow of water without having to pump additional fluids downhole in a remedial job, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a method 100 for a relative permeability modifier (RPM) that reduces friction while being pumped downhole, according to an embodiment. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 1 and described below is not intended to be limiting.

At operation 110, a concentration of a first polymer and a second polymer may be determined, wherein both the polymers are cationic polymers. The first polymer may be a first cationic polymer that hydrolyzes and a second polymer may be a second cationic polymer that doesn't hydrolyze, wherein the first cationic polymer may be configured to reduce friction and the second cationic polymer may be a RPM polymer. More specifically, the first polymer may be a AETAC/AM copolymers that hydrolyze and lose cationic functionality. The second polymer may be Polydiallyldimethylammonium chloride (PolyDADMAC) that is a homopolymer of diallyldimethylammonium chloride. Those skilled in the art will understand the friction reducing polymer can be defined by Zeta Potential. The Zeta Potential of a 20% by weight AETAC cationic copolymner friction reducer will typically be above +10 mV. Once hydrolyzed the Zeta Potential converts to a negative value that can be −50 mV.

At operation 120, the multiple polymers may be being pumped downhole together. Generally, the first polymer may act well as a friction reducer in the proppant pack, but loses long-term efficacy for water control due to hydrolysis and losing its cationic functionality.

At operation 130, the multiple polymers may be utilized in a fracturing procedure, help place proppant in the fracture, and be placed within a fracture. Specifically, the multiple polymers may adhere to silica or ceramic proppant. Since both polymers adhere to silica and ceramic surfaces, the multiple polymers can help to place proppant in the fracture by making it harder for the proppant to settle due to viscous drag. Furthermore, because the second polymer acting as an RPM polymer is in contact with the proppant before the proppant is introduced into the fracture, and more importantly before the proppant is in contact with any oil, the second polymer does not allow gel into oil and will not attach to oily surfaces.

At operation 140, at the multiple polymers are within the fracture or in a downhole environment, the first polymer monomer may degrade and the remaining polymer may lose its cationic charge becoming anionic. However, the first polymer and the second cationic polymer (the PolyDADMAC) may form a robust hydrogel overtime as the first polymer degrades. Specifically, the DADMAC polymers can form hydrogels with anionic terpolymers that include an anchoring monomer, such as such as N-Vinyl Pyrrolidone and N-Vinyl Formamide within the first polymer.

At operation 150, the formed hydrogel may limit water production from reservoirs, while allowing more vicious oil to flow through the hydrogel. Specifically, the polymer creates a viscous drag in high TDS water that allows the oil to be produced before water.

Accordingly, embodiments are directed towards a first polymer such as a HMW AETAC/AM cationic reducer copolymer being pumped with a second polymer such as a LMW DADMAC/AM copolymer. The first polymer is a friction reducer that hydrolyzes at reservoir conditions but is cross linked by the second polymer such as a polyDADMAC, allowing the first polymer and the second polymer to form a hydrogel. Specifically, the first polymer may provide friction reduction, while the second polymer provides long-term RPM, wherein the hydrogel adheres to silica and shale surfaces. Additionally, the combination of the first polymer and the second polymer may work in a proppant pack, not the shale permeability, and may reduce water flow through the hydrogel pack 70% to 90% based on column testing.

Figure 2:
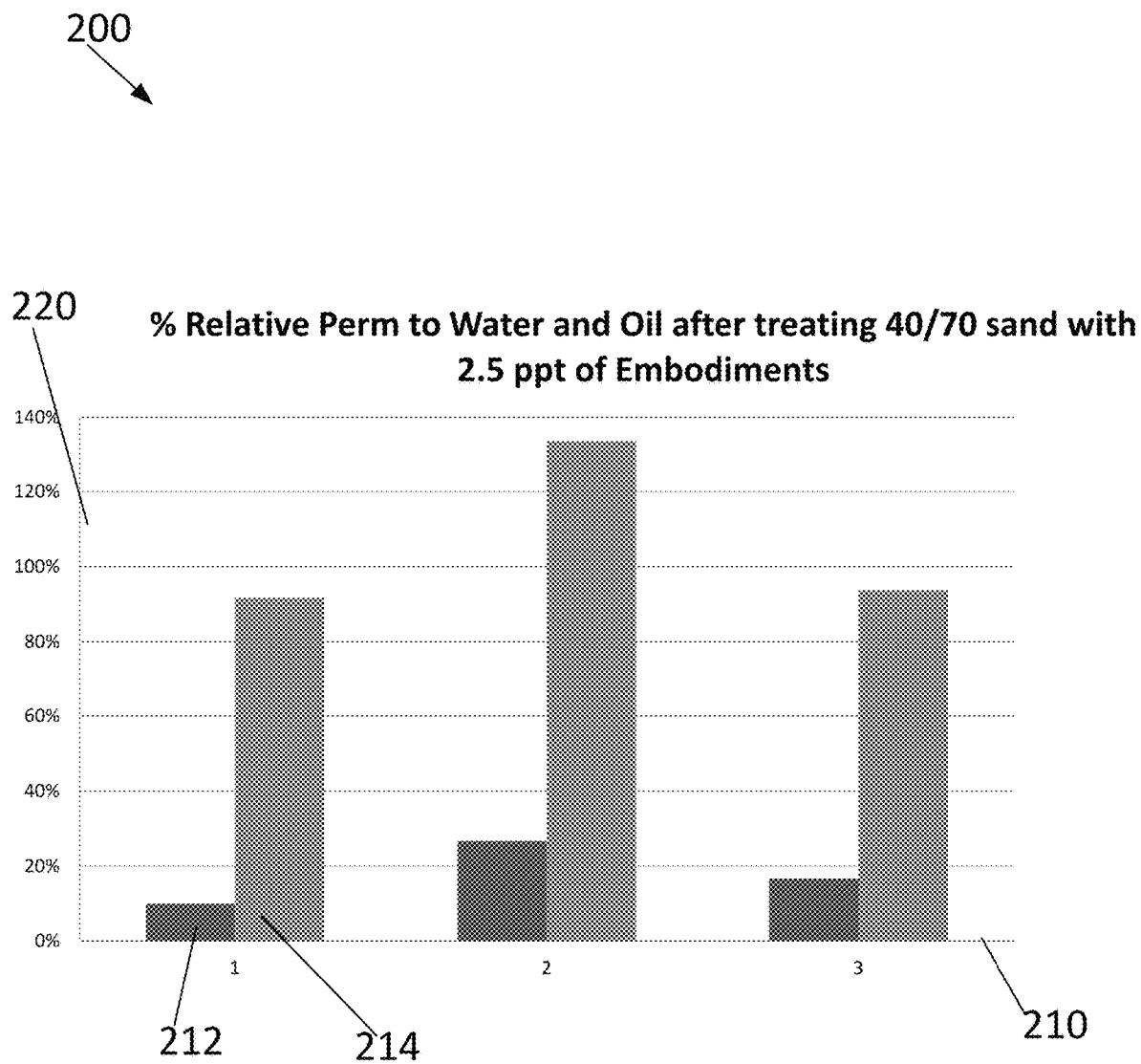
FIG. 2 depicts a graph of a column test of the relative permeability to water and oil after treating a coarse proppant (40/70 sand) that is highly spherical and crush resistant with roundness and sphericity values at least 0.07, according to embodiments.

FIG. 2 depicts a graph 200 of a column test of the relative permeability to water and oil after treating a coarse proppant (40/70 sand) that is highly spherical and crush resistant with roundness and sphericity values at least 0.07, according to embodiments. The coarse proppant may be used with a proppant pack, that is pumped downhole with a first As depicted in FIG. 2, in multiple tests 210 a percentage 220 of the relative permeability of water 212 is lower than the relative permeability of oil 214. The column tests may show that before treatment water flows through the coarse proppant at 67 ml/min. After treatment, water flows through the hydrogel at a rate of 7-10 ml/min. additionally, before treatment oil flows through the coarse proppant at a rate of 2.45 ml/min. After treatment, oil flows through the hydrogel at a rate of 0.82 to 4.05 ml/min.

As such, the hydrogel formed from the first polymer and the second polymer may decrease the flow rate of water, while potentially increasing the flow rate of oil.

Figure 3:
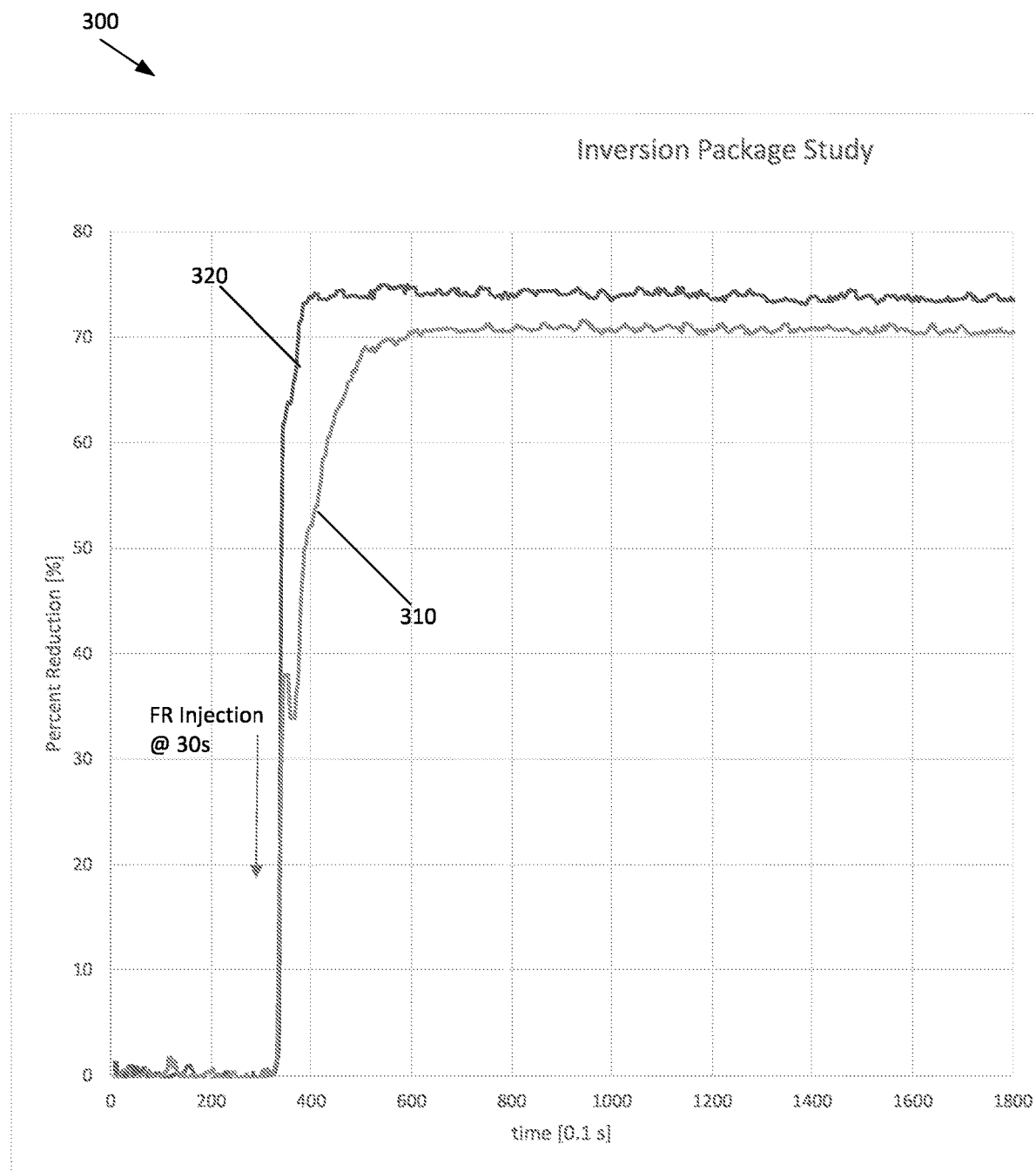
FIG. 3 depicts a graph of an inversion package study, according to an embodiment.

FIG. 3 depicts a graph 300 of an inversion package study, according to an embodiment. As depicted in graph 300, the friction reduction 320 of 0.25 gpt of the hydrogel in fresh water is slightly greater than the friction reduction 310 of 0.25 gpt of the hydrogel in Permian water. However, the friction reduction 310, 320 in both fresh water and Permian water remains high over time.

To this end, embodiments depict that the hydrogel allows for both friction reduction as well as increased permeability of oil while decreasing the permeability of water.

In embodiments, a hydrogel formed of multiple cationic may be formed in multiple ways. Furthermore, by adding multiple polymers together, different emulsions and polymers with different functionality may be created. For example, those skilled in the art may appreciate that adding salt to a polymer may lower the freeze point of emulsions. It is convenient to add the salt to first emulsion to reduce the freeze point of the final mixture. Sodium chloride is one such salt, but other salts synergistically work with polyacrylamide. In particular ammonium chloride, urea, ammonium sulfate and ammonium acetate help protect the polyacrylamide from detrimental effects of divalent ion such as calcium and magnesium. Because of the common ion effect, the ammonium ion improves the solubility of the polyacrylamide in water contain divalent ions. Adding these synergistic salts to the first emulsion will also significantly lower the freeze point of the final mixture.

In embodiments, other functionality may be added to the final mixture. For example, a biocide and/or a scale inhibitor can easily be added to the first emulsion before it is mixed with the polyacrylamide emulsion. A typical fracturing treatment includes friction reduction, scale inhibition and bactericide. With the embodiments, a simple, one component liquid can provides all the treating chemistry required for fracturing. Surprisingly, the resulting emulsion mixture remains a "thin" fluid that is easily handled and pumped.

In alternative embodiments, multiple emulsions may be polyacrylamide suspensions in oil that contain no free water.

The resultant suspension is based on dry polyacrylamide powder that is typically ground to a fine mesh for quick hydration. The suspension can contain up to 60% by weight ground polymer, but have the disadvantage of not being easily handled or pumped. Another disadvantage is that only water-free chemistries can be suspended. Adding any water to a suspension containing polyacrylamide hydrates the polyacrylamide polymer. Only water-free, oil soluble or dry. Chemistries can be used for suspensions. For example, scale inhibitors that are typically made in water solutions must first be dried into a powder before the scale inhibitor can be suspended. Furthermore, not all scale inhibitors can be made into a dry form. Most EPA-registered biocides are also water-based chemistries that cannot be used in slurries. The EPA allows for a "formulation exemptions" but not a change in physical form unless the new form is fully tested as a biocide. Many chemistries that work well in the oilfield simply do not lend themselves to the drying process or they become a waxy solid that cannot easily be suspended. Processing a water-based chemistry into a dry solid adds cost. As the solids loading in the suspension increases so does the viscosity and viscosity goes up exponentially.

Embodiments can be formulated to include widely used scale inhibitors and biocides in the first emulsion before it is mixed with the polyacrylamide emulsion concentrate. Practically both oil soluble and water-soluble chemistries can be formulated into the first emulsion and then mixed with the second polyacrylamide emulsion. There are any number of other functionalities that can be added to the first emulsion such as, but not limited to iron control, clay control, shale control, non-emulsifiers, surfactants, flow back aids, penetrating surfactants, polymers for relatively permeability modification, cross-linkers, etc.

In embodiments, the first emulsion can even contain chemistry that is not completely compatible with the second polyacrylamide emulsions. For example, an anionic polymer can be mixed with a cationic polymer to make a zeta gel that creates viscosity by the interaction of opposite zeta potential charges.

Those skilled in the art will be familiar with interpenetrating polymer networks that are typically made by polymerizing a polymer in the presence of another fully hydrated polymer. IPN chemistry is limited by the processing equipment because ultimate viscosity can be very high and the resultant solution polymers are typically very dilute. With embodiments a mixture two polymers can form a pseudo IPN by inverting and hydrating together while in intimate contact with one another.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A polymer mixture for downhole applications, the mixture comprising:
   a first cationic polymer that hydrolyzes;
   a second cationic polymer or cationic surfactant that does not hydrolyze, wherein the polymer mixture includes two pounds of the first cationic polymer and one gallon of a twenty percent solution of the second cationic polymer per thousand gallons, wherein the polymer mixture forms a hydrogel that reduces a water flow rate through the hydrogel and increases an oil flow rate through the hydrogel.

2. The polymer mixture of claim 1, wherein the first cationic polymer is a friction reducer, and the second cationic polymer or cationic surfactant is a relative permeability modifier.

3. The polymer mixture of claim 2, wherein the first cationic polymer is a Acryloyloxyethyltrimethyl Ammonium Chloride copolymer, and the second cationic polymer is a Polydiallyldimethylammonium chloride.

4. The polymer mixture of claim 2, wherein as the first cationic polymer degrades a hydrogel is formed of the first cationic polymer and the second cationic polymer.

5. The polymer mixture of claim 4, wherein the hydrogel limits water production from reservoirs while allowing viscous oil to flow through the hydrogel.

6. The polymer mixture of claim 5, wherein the viscous oil flows through the hydrogel before high total dissolved solids water.

7. The polymer mixture of claim 5, wherein the hydrogel is formed within a fracture in a downhole environment.

8. The polymer mixture of claim 7, wherein the first cationic polymer and the second cationic polymer are pumped downhole together.

9. The polymer mixture of claim 7, wherein the first cationic polymer hydrolyzes at reservoir conditions to cross-link crosslinked with the second cationic polymer.

10. The polymer mixture of claim 4, wherein the first cationic polymer and the second cationic polymer adhere to silica and ceramic surfaces.

11. The polymer mixture of claim 10, wherein the second cationic polymer is in contact with the polymer mixture before the polymer mixture is introduced into the fracture, and the hydrogel does not attach to oily surfaces.

* * * * *